United States Patent
Gadi et al.

(10) Patent No.: US 11,947,919 B2
(45) Date of Patent: Apr. 2, 2024

(54) INTERACTIVE DIALOGUE SYSTEM AND A METHOD FOR FACILITATING HUMAN MACHINE CONVERSATION

(71) Applicant: Zensar Technologies Limited, Maharashtra (IN)

(72) Inventors: Sridhar Gadi, Maharashtra (IN); Manish Kumar, Maharashtra (IN); Pavan Jakati, Maharashtra (IN); Neeraj Pandey, Maharashtra (IN)

(73) Assignee: Zensar Technologies Limited, Maharashtra (IN)

( * ) Notice: Subject to any disclaimer, the term of this patent is extended or adjusted under 35 U.S.C. 154(b) by 494 days.

(21) Appl. No.: 17/206,828

(22) Filed: Mar. 19, 2021

(65) Prior Publication Data

US 2022/0027573 A1 Jan. 27, 2022

(30) Foreign Application Priority Data

Jul. 25, 2020 (IN) .............................. 202021031942

(51) Int. Cl.
| | |
|---|---|
| *G06F 40/35* | (2020.01) |
| *G06F 16/33* | (2019.01) |
| *G06F 16/903* | (2019.01) |
| *G06F 16/906* | (2019.01) |
| *G06F 16/951* | (2019.01) |
| *G06N 20/20* | (2019.01) |

(52) U.S. Cl.
CPC .......... *G06F 40/35* (2020.01); *G06F 16/3344* (2019.01); *G06F 16/90335* (2019.01); *G06F 16/906* (2019.01); *G06F 16/951* (2019.01); *G06N 20/20* (2019.01)

(58) Field of Classification Search
None
See application file for complete search history.

(56) References Cited

U.S. PATENT DOCUMENTS

| | | | |
|---|---|---|---|
| 9,794,199 B2 | 10/2017 | Capper et al. | |
| 9,805,718 B2 | 10/2017 | Ayan et al. | |
| 2017/0230312 A1 | 8/2017 | Barrett et al. | |
| 2020/0210322 A1* | 7/2020 | Sen | G06F 11/3636 |
| 2021/0012222 A1* | 1/2021 | Kim | G06F 40/30 |
| 2021/0173836 A1* | 6/2021 | Robert Jose | G06F 16/248 |
| 2021/0390418 A1* | 12/2021 | Mass | G06N 3/045 |

* cited by examiner

*Primary Examiner* — Quynh H Nguyen
(74) *Attorney, Agent, or Firm* — Hamre, Schumann, Mueller & Larson, P.C.

(57) ABSTRACT

The present invention relates to a method for facilitating a human-machine conversation for responding to a user query received from a user. The method includes determining at least one of a category and a context of the user query and implementing a first model and a second model for responding to the user query. The second model is triggered when the first model is unable to respond to the user query. The method further includes configuring one or more crawlers for accessing corresponding one or more databases of a plurality of databases for retrieving the relevant information and generating a second model. The method also includes enabling the second model to present the relevant information to the user based on the second model score. The second model updates the first model with the relevant information and its corresponding second model score.

8 Claims, 4 Drawing Sheets

INTERACTIVE DIALOGUE SYSTEM AND A METHOD FOR FACILITATING HUMAN MACHINE CONVERSATION

TECHNICAL FIELD

The present disclosure relates to the field of an automated information retrieval system. More particularly, the present disclosure relates to an interactive dialog system and a method for facilitating human machine conversation.

BACKGROUND

The background information herein below relates to the present disclosure but is not necessarily prior art.

Now days, customer support service centers can be seen overloaded with abundance of queries, requests and issues called as tickets in general which are created or raised by end users or agents on behalf of end users. In view of this, most of the companies have started using automatic response system to respond to the queries raised by end users. However, most of these automatic response systems are based on historical data including previously raised queries and their corresponding responses. Such systems fail to provide satisfactory results when the query raised by the user do not matches with already stored queries.

Moreover, most of the conventional response systems directly or indirectly require some kind of human interventions. For example, such convention response systems are based on a query-response database created based on problem observed in a work environment by end user, service desk support staff and/or other technical staff monitoring the work environment. Thus, these systems directly or indirectly depend on their skill sets of the help desk agents and the information available to them. Therefore, such techniques are prone to human errors and inadequate to provide satisfactory response to user queries.

Even if the query gets resolved with a proper response due to human intervention, the technical challenge lies in how the existing response system shall learn about such responses. Once such setup of these response systems are done, it takes time to update their configuration to meet the ever growing queries/demand from the user side. Hence, catering to such demand using the existing configuration of the conventional response systems is another technical challenge.

It is therefore desirable to provide efficient, accurate, and automatic interactive response system to provide satisfactory results to complex user queries.

SUMMARY

One or more shortcomings discussed above are overcome, and additional advantages are provided by the present disclosure. Additional features and advantages are realized through the techniques of the present disclosure. Other embodiments and aspects of the present disclosure are described in detail herein and are considered a part of the disclosure.

According to an aspect, a method for facilitating a human-machine conversation for responding to a user query received from a user is disclosed. The method comprises determining at least one of a category and a context of the user query. The category and the context relates to a domain in which the human-machine conversation is provided. The method further comprises implementing a first model and a second model for responding to the user query. The second model is triggered when the first model is unable to respond to the user query. Upon triggering the second model, the method further comprises configuring one or more crawlers for accessing corresponding one or more databases of a plurality of databases, based on the at least one of the category and the context of the user query, for retrieving the relevant information. The method further comprises generating a second model score for the relevant information retrieved by the second model. Further, the method comprises enabling the second model to present the relevant information to the user based on the second model score. The second model updates the first model with the relevant information and its corresponding second model score such that the first model is capable of responding to a future query similar to the user query using the updated relevant information.

According to an aspect, an interactive dialogue system for facilitating a human-machine conversation for responding to a user query received from a user is disclosed. The system comprises a determining unit configured to determine at least one of a category and a context of the user query. The category and the context relates to a domain in which the human-machine conversation is provided. The system also comprises an implementing unit configured to implement a first model and a second model for responding to the user query. The second model is triggered when the first model is unable to respond to the user query. Upon triggering the second model, a configuring unit configures one or more crawlers for accessing corresponding one or more databases of a plurality of databases, based on the of the at least one of the category and the context of the user query, for retrieving the relevant information. The system further comprises a score generating unit for the second model configured to generate a second model score for the relevant information retrieved by the second model. The system also comprises a presenting unit configured to enable the second model to present the relevant information to the user based on the second model score. The second model updates the first model with the relevant information and its corresponding second model score such that the first model is capable of responding to a future query similar to the user query using the updated relevant information.

In the above paragraphs, the most important features of the disclosure have been outlined, in order that the detailed description thereof that follows may be better understood and in order that the present contribution to the art may be better appreciated. There are, of course, additional features of the disclosure that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important therefore that the claims be regarded as including such equivalent constructions as do not depart from the spirit and scope of the invention.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 3:
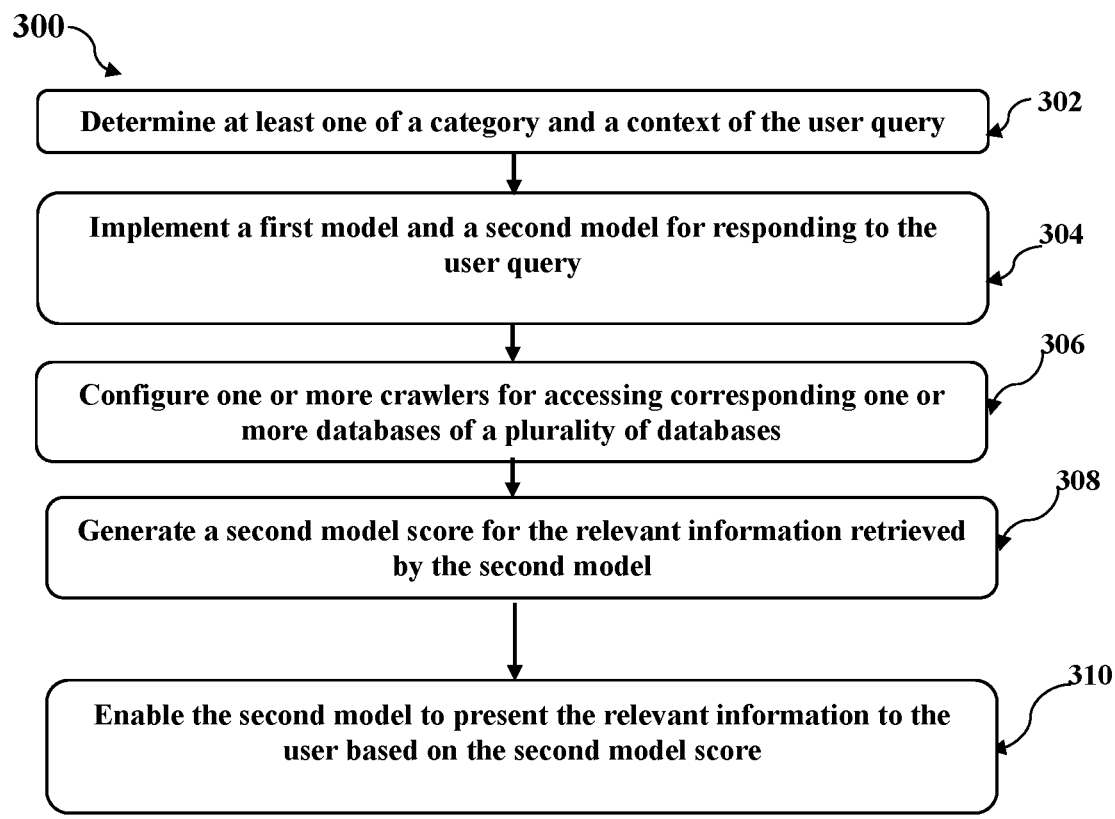
Figure 4:
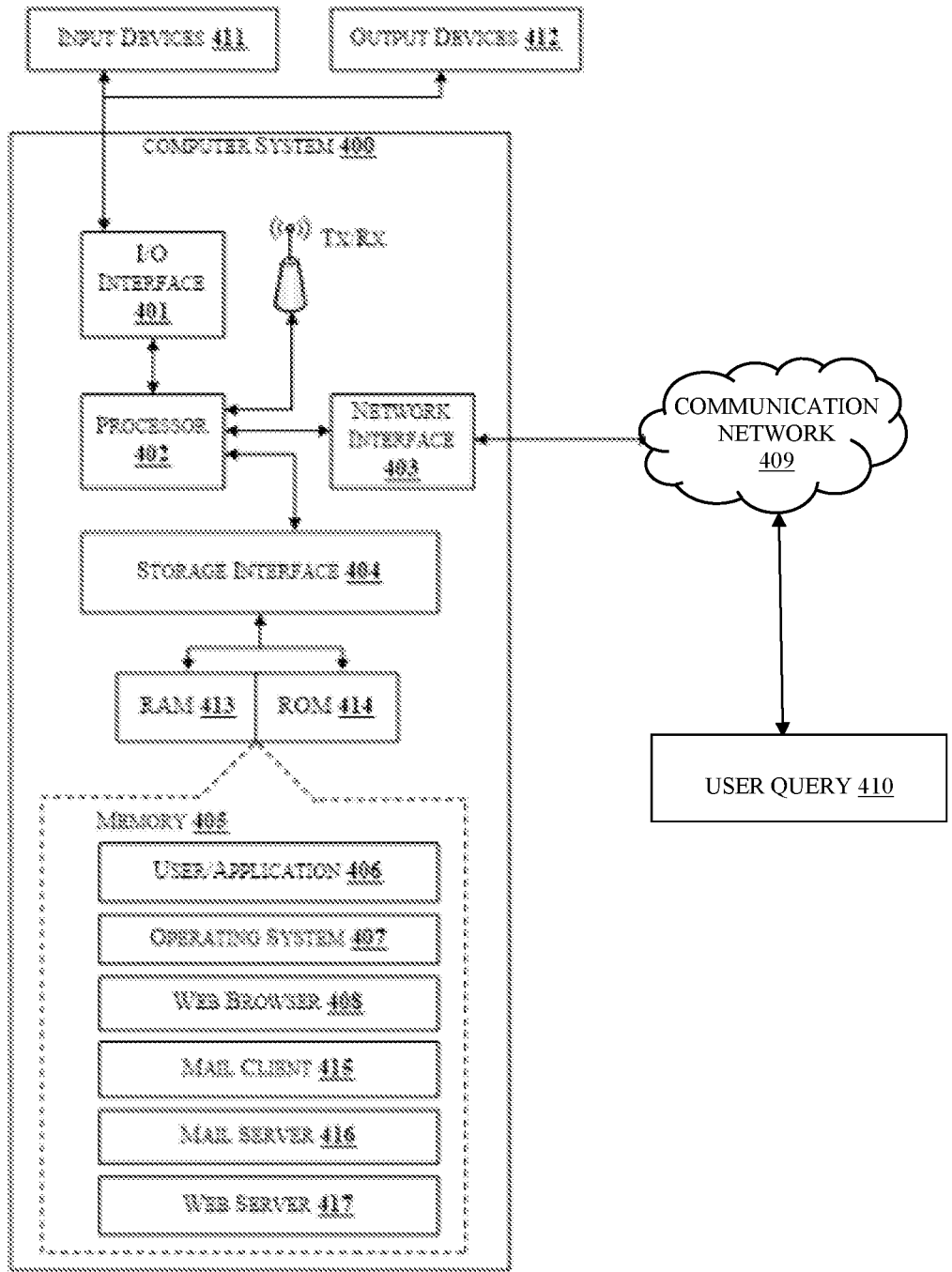

FIG. 3 shows a flowchart 300 illustrating a method for facilitating human machine conversation, in accordance with some embodiments of the present disclosure; and FIG. 4 illustrates a block diagram of an exemplary computer system for implementing embodiments consistent with the present disclosure It should be appreciated by those skilled in the art that any block diagrams herein represent conceptual views of illustrative systems embodying the principles of the present subject matter. Similarly, it will be appreciated that any flow charts, flow diagrams, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, apparatus, system or method that comprises a list of components or steps does not include only those components or steps but may include other components or steps not expressly listed or inherent to such setup or device or apparatus or system or method. In other words, one or more elements in a system or apparatus or device proceeded by "comprises . . . a" does not, without more constraints, preclude the existence of other elements or additional elements in the system or method.

The present disclosure relates to a method and a system for facilitating a human-machine conversation for responding to a user query received from a user. According to embodiments, the system and the method may be implemented for providing customer support services such as help desk, service desk, ecommerce websites and/or web portals. Now days, customer support service centers can be seen overloaded with abundance of queries, requests and issues called as tickets in general which are created or raised by end users or agents on behalf of end users. Hence, it becomes a challenge to provide satisfactory response to the user query. According some embodiments, the current information retrieval systems are time-consuming and incapable to provide satisfactory relevant information to a user.

The present disclosure addresses this issue by providing efficient interactive dialogue system which is capable of providing the satisfactory response to the user. According to an embodiment, the interactive dialogue system utilizes two different models i.e. a first model and a second model to provide relevant information to the user. The first model is associated with at least one dataset comprising one or more pre-stored queries and corresponding one or more responses to provide relevant information to the user. According to an embodiment, the first model works like frequency asked question (FAQ) model which serves the users with predefined answers to their queries. Whereas, the second model of the present disclosure is technically advance and is capable of handling those queries which are not being handled by the first model. The second model is built on machine learning technique which is capable of configuring one or more crawlers to access one or more databases of a plurality of databases associated with the second model. These databases may comprise at least one of standard operating procedure (SOP) database, manuals database, known error databases (KEBD), knowledge management databases, contracts database, and historical queries and responses database. Once the second model provides relevant information to the user in response to the user query, it simultaneously also updates the first model with the relevant information. This way, the present disclosure optimizes the resource utilization of the response systems by making the existing first models (or FAQ models) handle the future queries with similar context based on the learning. Therefore, the method and system respond to user query efficiently and satisfactorily.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
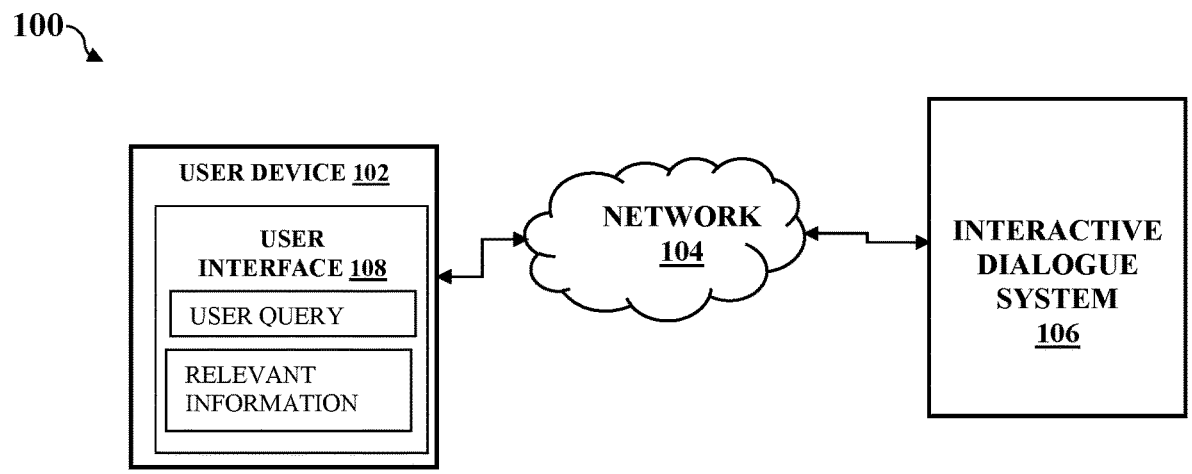
FIG. 1 shows an exemplary environment 100 illustrating an environment for facilitating human machine conversation, in accordance with some embodiments of the present disclosure.

FIG. 1 shows an exemplary environment 100 illustrating an environment for facilitating a human-machine conversation for responding to a user query received from a user, in accordance with some embodiments of the present disclosure.

The environment 100 comprises a user device 102 and an interactive dialogue system 106 communicably coupled to each other via a network 104. According to an exemplary embodiment, the interactive dialogue system 106 may be implemented for providing customer support services such as help desk, service desk, ecommerce websites and/or web portals.

According to an embodiment, the user device 102 may provide a user interface 108 to enable a user to interact with the interactive dialogue system 106. The user interface 108 may be configured to receive a user query from the user. In another embodiment, the user interface 108 may be configured to present the relevant information to the user corresponding to the received user query. The user device 102 may be communicably coupled to the interactive dialogue system 106 to transmit the received user query and receive the relevant information corresponding to the received user query. It may be understood to a skilled person that the functionality of the interactive dialogue system 106 may be implemented locally within the user device 102.

In some embodiments, the network 104 may include a data network such as, but not restricted to, the Internet, Local Area Network (LAN), Wide Area Network (WAN), Metropolitan Area Network (MAN), etc. In certain embodiments, the network 104 can include a wireless network, such as, but not restricted to, a cellular network and may employ various technologies including Enhanced Data rates for Global Evolution (EDGE), General Packet Radio Service (GPRS), Global System for Mobile Communications (GSM), Internet protocol Multimedia Subsystem (IMS), Universal Mobile Telecommunications System (UMTS) etc. In other embodiments, the network 104 may include or otherwise cover networks or subnetworks, each of which may include, for example, a wired or wireless data pathway. The network 104 may further include a circuit-switched voice network, a packet-switched data network, or any other network capable for carrying electronic communications. For example, the network may include networks based on the Internet protocol (IP) or Asynchronous Transfer Mode (ATM), and may support voice usage, for example, VoIP, Voice-over-ATM, or other comparable protocols used for voice data communications. In one implementation, the network 104 includes a cellular telephone network configured to enable exchange of text or SMS messages.

Figure 2:
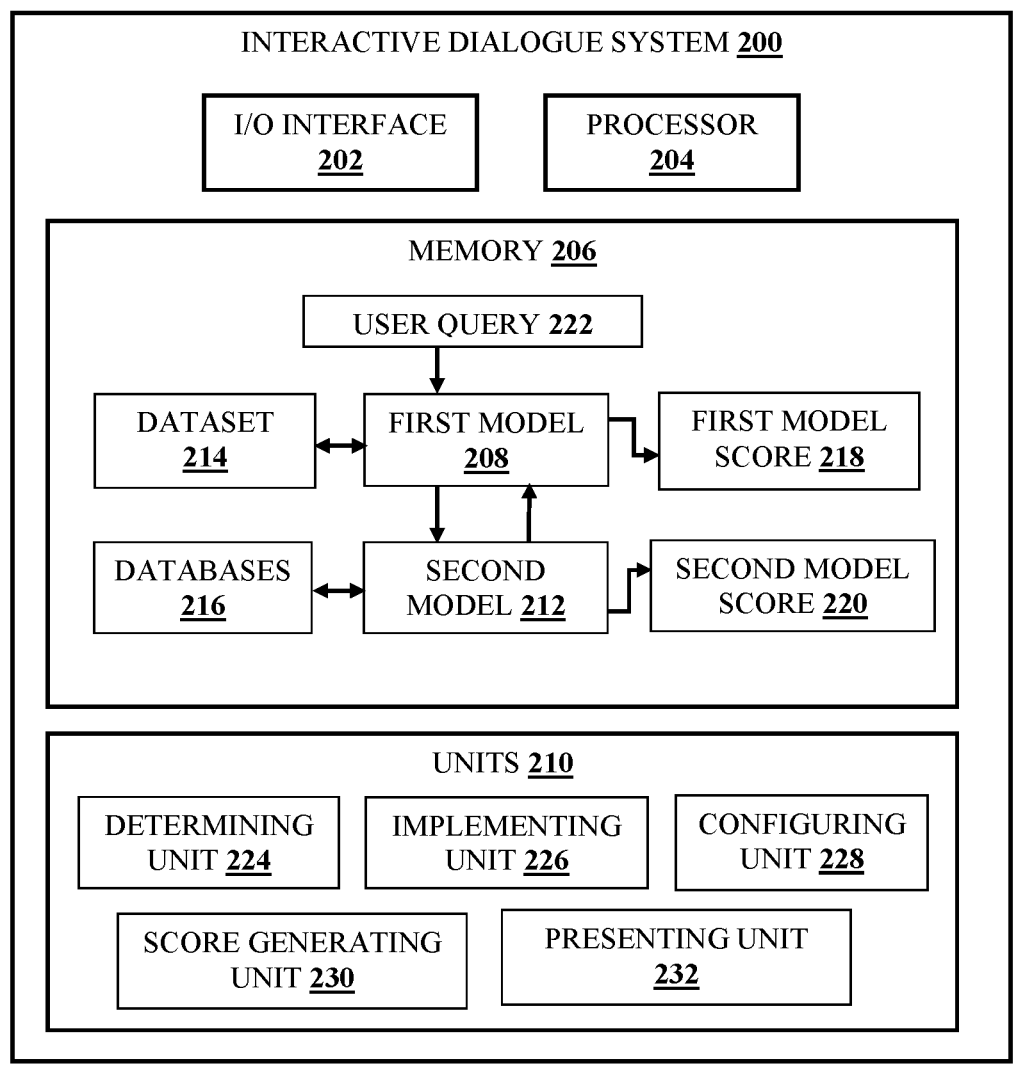
FIG. 2 shows a detailed block diagram of an interactive dialogue system 200 for facilitating human machine conversation, in accordance with some embodiments of the present disclosure.

Now, FIG. 1 is explained in conjunction with FIG. 2 to describe how the interactive dialogue system 200 is implement for facilitating a human-machine conversation for responding to the user query received from a user. The interactive dialogue system 200 may be similar to the interactive dialogue system 106 of FIG. 1.

According to an embodiment of present disclosure, the interactive dialogue system 200 may comprise input/output interface 202, a processor 204, a memory 206, and units 210. The I/O interface 202 may include a variety of software and hardware interfaces, for example, a web interface, a graphical user interface, input device, output device and the like. The I/O interface 202 may allow the interactive dialogue system 200 to interact with the user directly or through the user device 102. The memory 206 is communicatively coupled to the processor 204. Further, the memory 206 comprises of a first model 208, a second model 212, at least one dataset 214, a plurality of databases 216, a first model score 218, a second model score 220 and a user query 222. Further, the units 210 comprises a determining unit 224, an implementing unit 226, a configuring unit 228, a score generating unit 230 and a presenting unit 232. According to embodiments of the present disclosure, the processor 204 and the memory 206 may be communicably coupled to the one or more units 210 to implement one or more functionality of the units 210.

As explained in FIG. 1, the user device 102 may receive the user query 222 form the user. According to an embodiment, the user device 102 may transmit the received user query to the interactive dialogue system 200. According to an embodiment, the interactive dialogue system 200 may store the user query 222 in the memory 206. In an embodiment, the received user query 222 may be in form of a natural language query. For example, the user query 222 may comprise "I would like to check the refund status of my cancelled ticket", in an online travel portal. In another embodiment, the user query 222 may be received as one or more selections received from the user in response to the one or more questions being presented to the user at the user interface 108. For example, the interactive dialogue system 200 and/or the user device 102 may present some questions to the user such as, kindly select your query domain from the following options read as, cancellation, refund, booking and so forth. The user may select one or more presented options and based on that a query is formulated which is then transmitted by the user device 102 to the interactive dialogue system 200.

The determining unit 224 may be configured to determine at least one of a category and a context of the user query 222. In an embodiment, the category and the context relate to a domain in which the human-machine conversation is provided. Referring back to the above example of user query, the determining unit 224 may determine that the user query 222 relates to cancellation of a ticket and corresponding refund status from the keywords like "ticket", "refund" and "cancellation".

As discussed in above paragraphs, the implementing unit 226 may be configured to implement the first model 208 and the second model 212 for responding to the user query. The first model 208 may be associated with at least one dataset 214 comprising one or more pre-stored queries and corresponding one or more responses. In an embodiment, the at least one dataset 214 may be based on frequently raised tickets and/or query. The at least one dataset 214 may relate to environment in which the interactive dialogue system 200 is implemented. The first model 208 may implement at least one machine learning technique comprising random forest classifier, stochastic gradient descent classifier and Ada-Boost classifier upon the at least one dataset 214. Each of the machine learning technique from random forest classifier, stochastic gradient descent classifier and AdaBoost classifier may provide their accuracy score on the at least one dataset 214 and the first model 208 may select one of the machine learning classification technique based on their accuracy on the at least one dataset 214. It may be understood to a person skilled in the art that the implementation of the above said machine learning techniques may be performed during the initial configuration of the first model 208. In particular, the first model 208 may one of the above-mentioned machine learning technique based on their response and accuracy on the at least dataset 214.

In an embodiment, the score generating unit 230 may generate the first model score 218 for the relevant information corresponding to the user query, identified by the first model 208. The first model score 218 may also be referred to as knowledge value score (IKV) for the first model 208. The first model score 218 may include a summation of an accuracy score, a first document score, and a first user score which is explained herein detail.

According to an embodiment, the accuracy score may be generated based on the implementation of the at least one of the machine leaning techniques upon the at least one dataset 214. The interactive dialogue system 200 may store the accuracy score for a relevant information identified by the first model 208 to train the first model 208. The first document score may be generated by the following equation:

$$Ds_1 = \sum_{i=1}^{n} (IOQ_i * IOR_i)$$

Here $DS_1$ represents the first document score, $IOQ_i$ represents index of words for the user query, and $IOR_i$ represents index of the relevant information provided for the user query. The user score may be generated based on user feedback upon receiving the relevant information provided by the first model 208. The interactive dialogue system 200 may store the accuracy score for a relevant information identified by the first model 208. In an example, for a user query "How to code (IOQ1) Qubits (IOQ2) in CIRQ (IOQ3) framework (IOQ4)?", index of words for query may be equal to "IOQ1+IOQ2+IOQ3+IOQ4", the index of response for the query may be equal to "IOR1+IOR2+IOR3+IOR4+IOR5+IOR6+IOR7+IOR8", and the relevant information and/or response may be equal to "To code (IOR2) Qubit (IOR3) in CIRQ(IOR5) framework(IOR7) one should define Qubits in the form of NamedQubit or LineQubit or GridQubit".

In this scenario, the document score may equal to "(IOQ1*IOR2)+(IOQ2*IOR3)+(IOQ3*IOR5)+(IOQ4*IOR7)". The user score may be generated based on user feedback and the summation of accuracy score, document score and the user score may result into the first model score 218.

In some embodiments, the interactive dialogue system 200 may store each of the accuracy score, document score, user score and the first model score 218 (interchangeably referred to as the knowledge value score) corresponding to each query and response. The same is illustrated in below table:

| Query | Response | Accuracy Score(AS) | Document Score(DS) | UserScore(US) | Knowledge Score(IME KV or IKV) |
|---|---|---|---|---|---|
| Question1 | Response1 | 0.65 | 0.63 | 3 | 4.28 |
| Question2 | Response2 | 0.70 | 0.75 | 4 | 5.45 |
| Question3 | Response3 | 0.49 | 0.43 | 2 | 2.92 |
| Question4 | Response4 | 0.87 | 0.92 | 5 | 6.79 |
| Question5 | Response5 | 0.39 | 0.45 | 2 | 2.84 |
| Question6 | Response6 | 0.55 | 0.63 | 3 | 4.18 |

In the table illustrated above, a first response "Response 1" may be determined for the first query "Question1" and an accuracy score "0.65", a document score "0.63", and a user score 3 may be determined and/or calculated. Accordingly, a first model score 218 may be calculated as "0.65+0.63+3=4.25". Similarly, a first model score 218 may be calculated for each response determined for the corresponding query.

In an embodiment, the first model 208 may forward the query/ticket to the second model 212, when the first model 208 is unable to respond to the user query 222. In an earlier taken example for the user query 222 i.e. "I would like to check the refund status of my cancelled ticket", the first model 208 may not be able to determine the relevant information. The reason may be the first model 208 may not be configured to respond to those queries which include two different domains i.e. "refund" and "cancellation". In another embodiment, the first model 208 may determine one or more characteristics of the relevant information such as, but not limited to, the accuracy of the response, question domain, location, customer background etc. The first model 208 may also forward the user query 222 to the second model 212 based on the one or more determined characteristics of the relevant information.

Once the interactive dialogue system 106 understand that the first model 208 is unable to handle the user query, it triggers the second model 212. According to another embodiment, the second model 212 is triggered when the one or more determined characteristic of the relevant information identified by the first model 208 are not satisfactory. For example, in case of query related to refund, the response may vary depending upon the customer background such as, age of a person. However, the first model 208 may only be configured to provide response to refund query only on the basis general set of rules which relates to different set of property. In particular, in a ticket booking environment, the first model 208 may be configured to respond to a refund query based on timing of the cancellation of the ticket i.e. 6 hours before the train departure it may be 25% refund, 24 hours before the train departure it may be 75% and so on. However, there may be possibility that the senior citizen may be given some additional privilege and a refund of 25% may be available even when the train departed from the station. In such scenario, the response for the refund query provided by the first model 208 may be irrelevant and the query may be forwarded to the second model 212. In view of above explained example, if the first model 208 is unable to determine whether the user query relates to an account domain or a ticket cancellation domain, then the first model 208 may not be able to respond to the user query. In such scenarios, where the first model fails to respond to user query, most of the conventional response providing system fails.

To overcome this problem, the implementing unit 226 implements the second model 212 to provide response to the user query. According to an embodiment, the second model 212 may be built and trained using one or more natural language processing techniques such as, but not limited to, Bidirectional Encoder Representations from Transformers (BERT) technique. Upon triggering the second model 212, the configuring unit 228 may configure one or more crawlers for accessing corresponding one or more databases of the plurality of databases 216 based on at least one of the category and the context of the user query for retrieving the relevant information.

The plurality of databases 216 may include, but not limited to, at least one of standard operating procedure (SOP) database, manuals database, known error databases (KEBD), knowledge management databases, contracts database, and historical queries and responses database. The plurality of databases 216 may be based on various kind of data such as spatial data, text data, time series data, object-oriented data, transactional data, relational data, non-relational data and so forth. In an embodiment, the various kind of data may be selected, transformed, formatted and constructed based on requirement of the interactive dialogue system 200.

According to an embodiment, the one or more crawlers, of the second model 212, may be configured to implement at least one of Bidirectional Encoder Representations from Transformers (BERT) technique, T-Distributed Stochastic Neighbor Embeddings (T-SNE), and K-means clustering technique upon the plurality of databases 216 in relative to the user query. In an exemplary embodiment, information contained in the databases 216 are trained using BERT such that information is categorized into their respective model.

The categorization of the databases 216 enable efficient retrieval of the relevant information. In an embodiment, the second model 212 may use the BERT training to identify features in the data stored in the databases 216. The data stored in databases 216 may be passed to the BERT for features mapping. The BERT may refine and convert the documents into sentence embeddings i.e. Multilingual support and then into vector representation of around 500 dimensions. The documents represented as vectors may be scattered in around 500 dimensions. Therefore, in order to reduce the dimensions, the second model 212 may use the T-SNE technique to reduce vector representations into, for example 2-3 dimensions, for analysis.

The second model 212 may further implement the K-Means clustering technique for clustering lower dimensional embedding obtained from the T-SNE technique and generating cluster/features. The K-Means clustering technique may be applied to the sentences which returns sentences with the features. As a result, each sentence may now be assigned a feature/label. According to embodiments, the cluster generated using the K-Means clustering technique may be used to train data stored in the databases 216. In some embodiments, the data may include information related to prestored query or tickets and corresponding responses or actions. The generated clusters will have ticket information mapped based on the similarities from ticket information which was initially unstructured. The ticket information gathered will be shared with the one or more crawlers which may accordingly factor the most relevant ticket information and make it available to the end users or customers. This enables an efficient relevant information retrieval technique which consumes less time as compared to conventional techniques and may be implemented with zero or minimal human intervention.

According to an embodiment, the score generating unit 230 may generate a second model score 220 for the relevant information retrieved by the second model 212. The second model score 220 may include a summation of a cluster centroid score, a second document score and a second user score. According to an embodiment, the cluster centroid score may be generated based on K-means clustering technique. The second document score may be generated by following equations:

$$DS_2 = \sum_{i=1}^{n}(IOQ_i * IOR_i)$$

Here $DS_2$ represents the second document score, IOQ represents index of words for the user query, and IOR represents index of the relevant information provided for the user query by the second model 220. The second user score may be generated based on user feedback upon receiving the relevant information provided by the second model 220.

According to an example, for a query "How does theory (IOQ1) of Uncertainty (IOQ2) relates (IOQ3) to planks (IOQ4) constant (IOQ5)?", an index of words for query equals to "IOQ1+IOQ2+IOQ3+IOQ4", an Index of Response for Query equals to "IOR1+IOR2+IOR3+IOR4+ IOR5+IOR6+IOR7+IOR8" and the response may be equals to "The theory of uncertainty (IOR2) defines the position (IOR3) and momentum (IOR3) of a particle is always greater or equal to half of planks (IOR5) constant (IOR7)". In this scenario, the document score may be defined as "(IOQ2*IOR2)+(IOQ3*IOR3)+(IOQ3*IOR3)+(IOQ4* IOR5)+(IOQ5*IOR7)".

In some embodiments, the interactive dialogue system 200 may store each of the cluster centroid score, the document score, the user score and the second model score 220 (interchangeably referred to as the knowledge value score) corresponding to each query and response. The same is illustrated in below table:

| Query | Response | CCScore | DocumentScore | UserScore | KnowledgeScore(IME KV or IKV) |
|---|---|---|---|---|---|
| Question1 | Answer1 | 0.78 | 0.82 | 4 | 5.6 |
| Question2 | Answer2 | 0.56 | 0.62 | 3 | 4.18 |
| Question3 | Answer3 | 0.59 | 0.54 | 2 | 3.13 |
| Question4 | Answer4 | 0.89 | 0.86 | 5 | 6.75 |
| Question5 | Answer5 | 0.72 | 0.69 | 4 | 5.41 |
| Question6 | Answer6 | 0.67 | 0.77 | 5 | 6.44 |

In the table illustrated above, a first response "Answer 1" may be determined for the first query "Question1" and a cluster centroid score "0.78", a document score "0.82", and a user score 4 may be determined and/or calculated. Accordingly, a second model score 220 may be calculated as "0.78+0.80+4=5.6". Similarly, a second model score 220 may be calculated for each response determined for the corresponding query.

According to an alternative embodiment, in case both the first model 208 and the second 212 are unable to provide a satisfactorily relevant information corresponding to the user query, the first 208 and the second model 212 may assist a human support agent to identify the relevant information corresponding to the user query.

FIG. 3 shows a flowchart 300 illustrating a method for facilitating a human-machine conversation for responding to a user query received from a user, in accordance with some embodiments of the present disclosure.

As illustrated in FIG. 3, the method 300 includes one or more blocks illustrating a method to facilitate a human-machine conversation for responding to a user query received from a user. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 302, the determining unit 224 may determine at least one of a category and a context of the user query. The category and the context relates to a domain in which the human machine conversation is provided.

At block 304, the implementing unit 226 may implement the first model 208 and the second model 212. According to an embodiment, the second model 212 may be triggered when the first model 208 is unable to respond to the user query.

At block 306, the configuring unit 228 may configure one or more crawlers for accessing corresponding one or more databases of a plurality of databases 216, based on the at least one of the category and the context of the user query, for retrieving the relevant information.

At block 308, the score generating unit 230 may generate a second model score 220 for the relevant information retrieved by the second model 212.

At block 310, the presenting unit 232 may enable the second model 212 to present the relevant information to the user based on the second model score 220. The second model 212 updates the first model 208 with the relevant information and its corresponding second model score 220 such that the first model 208 is capable of responding to a future query similar to the user query using the updated relevant information.

Computer System

FIG. 4 illustrates a block diagram of an exemplary computer system 400 for implementing embodiments consistent with the present invention. In an embodiment, the computer system 400 can be the user device 102 and/or the interactive dialogue system 106, 200 which is used for facilitating a human-machine conversation for responding to a user query 410 received from a user. According to an embodiment, the computer system 400 may receive the user query 410 from the user. The computer system 400 may comprise a central processing unit ("CPU" or "processor") 402. The processor 402 may comprise at least one data processor for executing program components for executing user- or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data 406, an operating system 407, web browser 408 etc. In some embodiments, the computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. I/O interface 401 may facilitate display, execution, interaction, manipulation, or operation of program components through textual or graphical facilities. For example, I/O interface may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 400 may implement a web browser 408 stored program component. The web browser 408 may be a hypertext viewing application, such as Microsoft™ Internet Explorer, Google™ Chrome, Mozilla™ Firefox, Apple™ Safari™, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server 416 may be an Internet mail server such as Microsoft Exchange, or the like. The mail server 416 may utilize facilities such as Active Server Pages (ASP), ActiveX, American National Standards Institute (ANSI) C++/C #, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client 415 stored program component. The mail client 415 may be a mail viewing application, such as Apple™ Mail, Microsoft™ Entourage, Microsoft™ Outlook, Mozilla™ Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media Advantages of the Embodiment of the Present Disclosure are Illustrated Herein In an embodiment, the present disclosure provides a method for a human-machine conversation for responding to a user query received from a user even when a first system comprising datasets of pre-stored queries and responses is unable to respond to user query.

In another embodiment, the method of present disclosure optimizes resource utilization by configuring crawlers based on at least one of a category and a context such the one or more crawlers access only a limited number of databases from a plurality of databases.

In yet another embodiment, the method of present disclosure may intelligently assist a human agent by finding and correlating the relevant information from different sources and forming most relevant response to attend to the various type of user query based on scores.

In yet another embodiment, the method of present disclosure may configure one or more crawlers corresponding to one or more databases to provide relevant information corresponding to a user query in short span of time.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | ENVIRONMENT |
| 102 | USER DEVICE |
| 104 | NETWORK |
| 106 | INTERACTIVE DIALOGUE SYSTEM |
| 200 | INTERACTIVE DIALOGUE SYSTEM |
| 202 | I/O INTERFACE |
| 204 | PROCESSOR |
| 206 | MEMORY |
| 208 | FIRST MODEL |
| 210 | UNITS |
| 212 | SECOND MODEL |
| 214 | DATASET |
| 216 | DATABASES |
| 218 | FIRST MODEL SCORE |
| 220 | SECOND MODEL SCORE |
| 222 | USER QUERY |
| 224 | DETERMINING UNIT |
| 226 | IMPLEMENTING UNIT |
| 228 | CONFIGURING UNIT |
| 230 | SCORE GENERATING UNIT |
| 232 | PRESENTING UNIT |
| 400 | EXEMPLARY COMPUTER SYSTEM |
| 401 | I/O INTERFACE OF THE EXEMPLARY COMPUTER SYSTEM |
| 402 | PROCESSOR OF THE EXEMPLARY COMPUTER SYSTEM |
| 403 | NETWORK INTERFACE |
| 404 | STORAGE INTERFACE |
| 405 | MEMORY OF THE EXEMPLARY COMPUTER SYSTEM |
| 406 | USER/APPLICATION |
| 407 | OPERATING SYSTEM |
| 408 | WEB BROWSER |

-continued

| Reference Number | Description |
| --- | --- |
| 409 | COMMUNICATION NETWORK |
| 410 | USER QUERY |
| 411 | INPUT DEVICES |
| 412 | OUTPUT DEVICES |
| 413 | RAM |
| 414 | ROM |
| 415 | MAIL CLIENT |
| 416 | MAIL SERVER |
| 417 | WEB SERVER |

We claim:

1. A method for facilitating a human-machine conversation for responding to a user query received from a user, the method comprising:
determining at least one of a category and a context of the user query, wherein the category and the context relates to a domain in which the human-machine conversation is provided;
implementing a first model and a second model for responding to the user query, wherein the first model is associated with at least one dataset comprising one or more pre-stored queries and corresponding one or more responses, and wherein the first model is further configured to implement one or more machine learning techniques comprising random forest classifier, stochastic gradient descent classifier, and AdaBoost classifier upon the at least one dataset, and wherein the first model further comprising generating a first model score comprising a summation of an accuracy score, a first document score, and a first user score, wherein
the first model score is generated when the first model is capable of providing the relevant information in response to the user query, and wherein:
the accuracy score is generated based on the implementation of the at least one of the machine leaning techniques upon the at least one dataset,
the first document score is generated by:

$$DS_1 = \sum_{i=1}^{n}(IOQ_i * IOR_i)$$

wherein, $DS_1$ represents the first document score,
IOQ represents index of words for the user query, and
IOR represents index of the relevant information provided for the user query, and
the user score is generated based on user feedback upon receiving the relevant information provided by the first model, and
wherein the second model is triggered when the first model is unable to respond to the user query, and wherein, upon triggering the second model, the method further comprising:
configuring one or more crawlers for accessing corresponding one or more databases of a plurality of databases, based on the at least one of the category and the context of the user query, for retrieving the relevant information;
generating a second model score for the relevant information retrieved by the second model; and
enabling the second model to present the relevant information to the user based on the second model score, wherein the second model updates the first model with the relevant information and its corresponding second model score such that the first model is capable of responding to a future query similar to the user query using the updated relevant information.

2. The method as claimed in claim 1, wherein the plurality of databases comprises at least one of standard operating procedure (SOP) database, manuals database, known error databases (KEBD), knowledge management databases, contracts database, and historical queries and responses database.

3. The method as claimed in claim 1, further comprising implementing, by the second model, at least one of Bidirectional Encoder Representations from Transformers (BERT) technique, T-Distributed Stochastic Neighbor Embeddings (T-SNE), and K-means clustering technique upon the plurality of databases.

4. The method as claimed in claim 3, wherein the second model score comprising a summation of a cluster centroid score, a second document score and a second user score, and wherein:
the cluster centroid score is generated based on the K-means clustering technique,
the second document score is generated:

$$DS_2 = \sum_{i=1}^{n}(IOQ_i * IOR_i)$$

wherein, $DS_2$ represents the second document score,
$IOQ_i$ represents index of words for the user query, and
$IOR_i$ represents index of the relevant information provided for the user query by the second model, and
the second user score is generated based on user feedback upon receiving the relevant information provided by the second model.

5. An interactive dialogue system for facilitating a human-machine conversation for responding to a user query received from a user, the system comprising:
a determining unit configured to determine at least one of a category and a context of the user query, wherein the category and the context relates to a domain in which the human-machine conversation is provided;
an implementing unit configured to implement a first model and a second model for responding to the user query, wherein the second model is triggered when the first model is unable to respond to the user query, wherein the first model is associated with at least one dataset comprising one or more pre-stored queries and corresponding one or more responses, and wherein the first model is further configured to implement one or more machine learning techniques comprising random forest classifier, stochastic gradient descent classifier, and AdaBoost classifier upon the at least one dataset, and wherein the first model further comprising generating a first model score comprising a summation of an accuracy score, a first document score, and a first user score, wherein
the first model score is generated when the first model is capable of providing the relevant information in response to the user query, and wherein:
the accuracy score is generated based on the implementation of the at least one of the machine leaning techniques upon the at least one dataset, the first document score is generated by:

$$DS_1 = \sum_{i=1}^{n}(IOQ_i * IOR_i)$$

wherein, $DS_1$ represents the first document score,
IOQ represents index of words for the user query, and
IOR represents index of the relevant information provided for the user query, and
the user score is generated based on user feedback upon receiving the relevant information provided by the first model, and wherein, upon triggering the second model:
a configuring unit configures one or more crawlers for accessing corresponding one or more databases of a plurality of databases, based on the of the at least one of the category and the context of the user query, for retrieving the relevant information;
a score generating unit for the second model configured to generate a second model score for the relevant information retrieved by the second model; and
a presenting unit configured to enable the second model to present the relevant information to the user based on the second model score, wherein the second model updates the first model with the relevant information and its corresponding second model score such that the first model is capable of responding to a future query similar to the user query using the updated relevant information.

6. The interactive dialogue system as claimed in claim 5, wherein the plurality of databases comprises at least one of standard operating procedure (SOP) database, manuals database, known error databases (KEBD), knowledge management databases, contracts database, and historical queries and responses database.

7. The interactive dialogue system as claimed in claim 5, wherein the second model is further configured to implement at least one of Bidirectional Encoder Representations from Transformers (BERT) technique, T-Distributed Stochastic Neighbor Embeddings (T-SNE), and K-means clustering technique upon the plurality of databases.

8. The interactive dialogue system as claimed in claim 5, wherein the second model score comprising a summation of a cluster centroid score, a second document score and a second user score, and wherein:
the cluster centroid score is generated based on the K-means clustering technique,
the second document score is generated:

$$DS_2 = \sum_{i=1}^{n}(IOQ_i * IOR_i)$$

wherein, $DS_2$ represents the second document score,
$IOQ_i$ represents index of words for the user query, and
$IOR_i$ represents index of the relevant information provided for the user query by the second model, and
the second user score is generated based on user feedback upon receiving the relevant information provided by the second model.

\* \* \* \* \*